US010110881B2

(12) United States Patent
Shotton et al.

(10) Patent No.: US 10,110,881 B2
(45) Date of Patent: Oct. 23, 2018

(54) MODEL FITTING FROM RAW TIME-OF-FLIGHT IMAGES

(71) Applicant: Microsoft Technology Licensing, LLC, Redmond, WA (US)

(72) Inventors: Jamie Daniel Joseph Shotton, Cambridge (GB); Toby Sharp, Cambridge (GB); Jonathan James Taylor, Toronto (CA); Pushmeet Kohli, Cambridge (GB); Shahram Izadi, Cambridge (GB); Andrew William Fitzgibbon, Cambridge (GB); Reinhard Sebastian Bernhard Nowozin, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 14/528,928

(22) Filed: Oct. 30, 2014

(65) Prior Publication Data
US 2016/0127715 A1    May 5, 2016

(51) Int. Cl.
| | | |
|---|---|---|
| *H04N 13/02* | (2006.01) | |
| *H04N 13/279* | (2018.01) | |
| *G06K 9/62* | (2006.01) | |
| *G06K 9/00* | (2006.01) | |

(52) U.S. Cl.
CPC ....... *H04N 13/279* (2018.05); *G06K 9/00214* (2013.01); *G06K 9/00382* (2013.01); *G06K 9/00389* (2013.01); *G06K 9/6202* (2013.01)

(58) Field of Classification Search
CPC ........... H04N 13/0278; G06K 9/00214; G06K 9/00382; G06K 9/00389; G06K 9/6202
See application file for complete search history.

(56) References Cited

U.S. PATENT DOCUMENTS

| | | | |
|---|---|---|---|
| 7,372,977 B2 | 5/2008 | Fujimura et al. | |
| 7,974,443 B2 | 7/2011 | Kipman et al. | |
| 8,351,646 B2 | 1/2013 | Fujimura et al. | |
| 8,724,906 B2 | 5/2014 | Shotton et al. | |
| 2007/0274396 A1* | 11/2007 | Zhang ................. | H04N 19/176 375/240.24 |

(Continued)

OTHER PUBLICATIONS

Kahn (Reducing the gap between Augmented Reality and 3D modeling with real-time depth imaging, Virtual Reality, Jun. 1, 2013 Virtual Press, Waltham Cross, GB, vol. 17, Nr: 2, pp. 111-123, Pub. Dec. 23, 2011).*

(Continued)

*Primary Examiner* — Sathyanaraya V Perungavoor
*Assistant Examiner* — Peet Dhillon
(74) *Attorney, Agent, or Firm* — Schwegman Lundberg & Woessner, P.A.

(57) ABSTRACT

Model fitting from raw time of flight image data is described, for example, to track position and orientation of a human hand or other entity. In various examples, raw image data depicting the entity is received from a time of flight camera. A 3D model of the entity is accessed and used to render, from the 3D model, simulations of raw time of flight image data depicting the entity in a specified pose/shape. The simulated raw image data and at least part of the received raw image data are compared and on the basis of the comparison, parameters of the entity are computed.

19 Claims, 8 Drawing Sheets

(56) References Cited

U.S. PATENT DOCUMENTS

| | | | | |
|---|---|---|---|---|
| 2008/0056354 | A1* | 3/2008 | Sun | H04N 19/176 375/240.12 |
| 2010/0034427 | A1 | 2/2010 | Fujimura et al. | |
| 2010/0246673 | A1* | 9/2010 | Tanaka | H04N 21/4307 375/240.12 |
| 2010/0277489 | A1* | 11/2010 | Geisner | G06F 3/011 345/581 |
| 2010/0278393 | A1* | 11/2010 | Snook | G06F 3/011 382/107 |
| 2010/0302247 | A1* | 12/2010 | Perez | G06K 9/00201 345/440 |
| 2010/0306716 | A1* | 12/2010 | Perez | A63F 13/213 715/863 |
| 2011/0007142 | A1* | 1/2011 | Perez | G06F 3/017 348/77 |
| 2011/0205337 | A1 | 8/2011 | Ganapathi et al. | |
| 2011/0268316 | A1* | 11/2011 | Bronder | G06F 3/017 382/103 |
| 2012/0098935 | A1* | 4/2012 | Schmidt | G01S 17/89 348/46 |
| 2012/0105585 | A1* | 5/2012 | Masalkar | H04N 13/0022 348/46 |
| 2012/0127176 | A1 | 5/2012 | Margolis | |
| 2012/0194517 | A1* | 8/2012 | Izadi | G06T 17/00 345/420 |
| 2013/0229395 | A1* | 9/2013 | Mills | H04N 5/367 345/207 |
| 2013/0273968 | A1* | 10/2013 | Rhoads | G06F 17/30244 455/556.1 |
| 2013/0342739 | A1* | 12/2013 | Yanowitz | H04N 5/367 348/246 |
| 2014/0028916 | A1* | 1/2014 | Toyoda | H04N 21/4307 348/547 |
| 2014/0098093 | A2 | 4/2014 | Haker et al. | |
| 2014/0166858 | A1* | 6/2014 | Lee | H04N 5/3696 250/208.1 |
| 2014/0212000 | A1* | 7/2014 | Yagcioglu | G06T 7/0042 382/103 |

OTHER PUBLICATIONS

"3 Gear Systems Inc", Retrieved on: Aug. 19, 2014, Available at: http://threegear.com.

Athitsos, et al., "Estimating 3D hand pose from a cluttered image", In Proceedings of IEEE Computer Society Conference on Computer Vision and Pattern Recognition, Jun. 16, 2003, 8 pages.

Ballan, et al., "Motion Capture of Hands in Action using Discriminative Salient Points", In Proceedings of 12th European Conference on Computer Vision, Oct. 7, 2012, 14 pages.

Bray, et al., "Smart Particle Filtering for 3D Hand Tracking", In Proceedings of the Sixth IEEE International Conference on Automatic Face and Gesture Recognition, May 17, 2004, 6 pages.

Criminisi, et al., "Decision Forests for Computer Vision and Medical Image Analysis", In Springer, Feb. 7, 2013, 2 pages.

Dam, et al., "Quaternions, Interpolation and Animation", In Technical Report DIKU-TR-98/5, University of Copenhagen, Jul. 17, 1998, 103 pages.

Gorce, et al., "Model-based 3D Hand Pose Estimation from Monocular Video", In IEEE Transactions on Pattern Analysis and Machine Intelligence, vol. 33, Issue: 9, Sep. 2011, 14 pages.

Dipietro, et al., "A Survey of Glove-Based Systems and their Applications", In IEEE Transactions on Systems, Man, and Cybernetics, Part C: Applications and Reviews, vol. 38, Issue: 4, Jul. 2008, 22 pages.

Erol, et al., "Vision-based Hand Pose Estimation: A review", In Proceedings of Computer Vision and Image Understanding 108, Oct. 2007, 22 pages.

Gall, et al., "Hough Forests for Object Detection, Tracking, and Action Recognition", In IEEE Transactions on Pattern Analysis and Machine Intelligence, vol. 33, No. 11, Nov. 2011, 15 pages.

Girshick, et al., "Efficient Regression of General-Activity Human Poses from Depth Images", In Proceedings of the International Conference on Computer Vision, Nov. 6, 2011, 8 pages.

Heap, et al., "Towards 3D Hand Tracking using a Deformable Model", In Proceedings of the Second International Conference on Automatic Face and Gesture Recognition, Oct. 14, 1996, 6 pages.

Juang, Chia-Feng, "A Hybrid of Genetic Algorithm and Particle Swarm Optimization for Recurrent Network Design", In Proceedings of the IEEE Transactions on Systems, Man, and Cybernetics—Part B: Cybernetics, vol. 34, No. 2, Apr. 2004, 10 pages.

Keskin, et al., "Hand Pose Estimation and Hand Shape Classification using Multilayered Randomized Decision Forests", In Proceedings of the 12th European Conference on Computer Vision, Oct. 7, 2012, 4 pages.

Kim, et al., "Digits: Freehand 3D Interactions Anywhere using a Wrist-Worn Gloveless Sensor", In Proceedings of the 25th annual ACM symposium on User interface software and technology, Oct. 7, 2012, 10 pages.

Krupka, et al., "Discriminative Ferns Ensemble for Hand Pose Recognition", In Proceedings of the IEEE Conference on Computer Vision and Pattern Recognition, Jun. 23, 2014, 8 pages.

"Leap Motion Inc", Retrieved on: Aug. 20, 2014, Available at: http://leapmotion.com/product.

Melax, et al., "Dynamics Based 3D Skeletal Hand Tracking", In Proceedings of Graphics Interface, May 29, 2013, 8 pages.

Oikonomidis, et al., "Efficient Model-Based 3D Tracking of Hand Articulations using Kinect", In Proceedings of British Machine Vision Conference, Aug. 29, 2011, 11 pages.

Oikonomidis, et al., "Full DOF Tracking of a Hand Interacting with an Object by Modeling Occlusions and Physical Constraints", In Proceedings of the IEEE International Conference on Computer Vision, Nov. 6, 2011, 8 pages.

Oikonomidis, et al., "Tracking the Articulated Motion of Two Strongly Interacting Hands", In Proceedings IEEE Conference on the Computer Vision and Pattern Recognition, Jun. 16, 2012, 8 pages.

Oikonomidis, et al., "Evolutionary Quasi Random Search for Hand Articulations Tracking", In Proceedings of the IEEE Conference on Computer Vision and Pattern Recognition, Jun. 23, 2014, 8 pages.

Qian, et al., "Realtime and Robust Hand Tracking from Depth", In Proceedings of Computer Vision and Pattern Recognition, Jun. 2014, 8 pages.

Shotton, et al., "Real-Time Human Pose Recognition in Parts from a Single Depth Image", In Proceedings of Computer Vision and Pattern Recognition, Jun. 2011, 8 pages.

Shotton, et al., "Decision Jungles: Compact and Rich Models for Classification", In Proceedings of Advances in Neural Information Processing Systems, Dec. 5, 2013, 9 pages.

Sridhar, et al., "Interactive Markerless Articulated Hand Motion Tracking using RGB and Depth Data", In Proceedings of IEEE International Conference on Computer Vision, Dec. 3, 2013, 8 pages.

Stenger, et al., "Model-Based 3D Tracking of an Articulated Hand", In Proceedings of IEEE Computer Society Conference on Computer Vision and Pattern Recognition, Dec. 8, 2001, 16 pages.

Sun, et al., "Conditional Regression Forests for Human Pose Estimation", In Proceedings of IEEE Conference on Computer Vision and Pattern Recognition, Jun. 16, 2012, 8 pages.

Tang, et al., "Real-Time Articulated Hand Pose Estimation using Semi-Supervised Transductive Regression Forests", In Proceedings of IEEE International Conference on Computer Vision, Sep. 30, 2013, 8 pages.

Tang, et al., "Latent Regression Forest: Structured Estimation of 3D Articulated Hand Posture", In Proceedings of IEEE Conference on Computer Vision and Pattern Recognition, Jun. 9, 2014, 8 pages.

Taylor, et al., "The Vitruvian Manifold: Inferring Dense Correspondences for One-Shot Human Pose Estimation", In IEEE Conference on Computer Vision and Pattern Recognition, Jun. 16, 2012, 8 pages.

Taylor, et al., "User-Specific Hand Modeling from Monocular Depth Sequences", In IEEE Conference on Computer Vision and Pattern Recognition, Jun. 24, 2014, 8 pages.

(56) References Cited

OTHER PUBLICATIONS

Tompson, et al., "Real-Time Continuous Pose Recovery of Human Hands using Convolutional Networks", In Proceedings of ACM Transactions on Graphics, vol. 33, Issue 4, Jul. 2014, 10 pages.
Wang, et al., "Real-Time Hand-Tracking with a Color Glove", In Proceedings of ACM Transactions on Graphics, vol. 28, No. 3, Jul. 2009, 8 pages.
Wang, et al., "6D Hands: Markerless Hand-Tracking for Computer Aided Design", In Proceedings of the 24th annual ACM symposium on User interface software and technology, Oct. 16, 2011, 9 pages.
Wang, et al., "Video-Based Hand Manipulation Capture through Composite Motion Control", In Proceedings of ACM Transactions on Graphics, vol. 32 Issue 4, Jul. 21, 2013, 14 pages.
Wu, et al., "View-Independent Recognition of Hand Postures", In Proceedings of IEEE Conference on Computer Vision and Pattern Recognition, Jun. 13, 2000, 7 pages.
Wu, et al., "Capturing Natural Hand Articulation", In Proceedings of the 8th International Conference on Computer Vision, vol. 2, Jul. 7, 2001, 7 pages.
Xu, et al., "Efficient Hand Pose Estimation from a Single Depth Image", In Proceedings of the IEEE International Conference on Computer Vision, Dec. 1, 2013, 7 pages.
Yuille, et al., "Vision as Bayesian Inference: Analysis by Synthesis?", In Proceedings of Trends in Cognitive Sciences, vol. 10, No. 7, Jul. 2006, 8 pages.
Zhao, et al., "Combining Markerbased Mocap and RGB-D Camera for Acquiring High-Fidelity Hand Motion Data", In Proceedings of the ACM SIGGRAPH/Eurographics Symposium on Computer Animation, Jul. 29, 2012, 10 pages.
Joo, et al., "Hand Detection in Depth Images Using Features of Depth Difference", In Proceedings of the International Conference on Image Processing, Computer Vision, and Pattern Recognition, Jul. 22, 2013, 2 pages.
Trindade, et al., "Hand Gesture Recognition Using Color and Depth Images Enhanced with Hand Angular Pose Data", In IEEE Conference on Multisensor Fusion and Integration for Intelligent Systems, Sep. 13, 2012, pp. 71-76.
Cho, et al., "Self-Occlusion Robust 3D Human Pose Tracking from Monocular Image Sequence", In IEEE International Conference on Systems, Man, and Cybernetics, Oct. 14, 2012, pp. 254-257.
Meers, et al., "Head-Pose Tracking with a Time-of-Flight Camera", In Proceedings of the Australasian Conference on Robotics & Automation, Dec. 2008, 9 pages.
Izadi, et al., "KinectFusion: Real-time 3D Reconstruction and Interaction Using a Moving Depth Camera", Proceedings of the 24th Annual ACM Symposium on User Interface Software and Technology, ACM, 2011, pp. 559-568.
Jordt, et al., "Reconstruction of Deformation from Depth and Color Video with Explicit Noise Models", Correct System Design: Lecture Notes in Computer Science, Springer-Verlag Berlin Heidelberg, 2013, pp. 128-146.
Kahn, "Reducing the gap between Augmented Reality and 3D modeling with real-time depth imaging", Virtual Reality, vol. 17, No. 2, Springer 2011, pp. 111-123.
PCT Search Report and Written Opinion dated Feb. 8, 2016 for PCT Application No. PCT/US15/57436, 13 pages.

* cited by examiner

MODEL FITTING FROM RAW TIME-OF-FLIGHT IMAGES

BACKGROUND

Time-of-flight (TOF) cameras are increasingly used in a variety of applications, for example, human computer interaction, automotive applications, measurement applications and machine vision. A TOF camera can be used to generate depth maps which contain information relating to the depth of an object in a scene from the camera. The depth refers to the projection of distance on an imaginary line that extends from the camera, where the distance is the absolute radial distance. A light source at the TOF camera illuminates the scene and the light is reflected by objects in the scene. The camera receives the reflected light that, dependent on the distance of an object to the camera, experiences a delay. Given the fact that the speed of light is known, a depth map may be generated.

The embodiments described below are not limited to implementations which solve any or all of the disadvantages of known time of flight cameras or time of flight image processing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Model fitting from raw time of flight image data is described, for example, to track any of: position, orientation, shape of a human hand or other entity. In various examples, raw image data depicting the entity is received from a time of flight camera. A 3D model of the entity is accessed and used to render, from the 3D model with specified values of parameters of the model, simulations of raw time of flight image data depicting the entity. The simulated raw image data and at least part of the received raw image data are compared and on the basis of the comparison, parameters of the entity are computed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
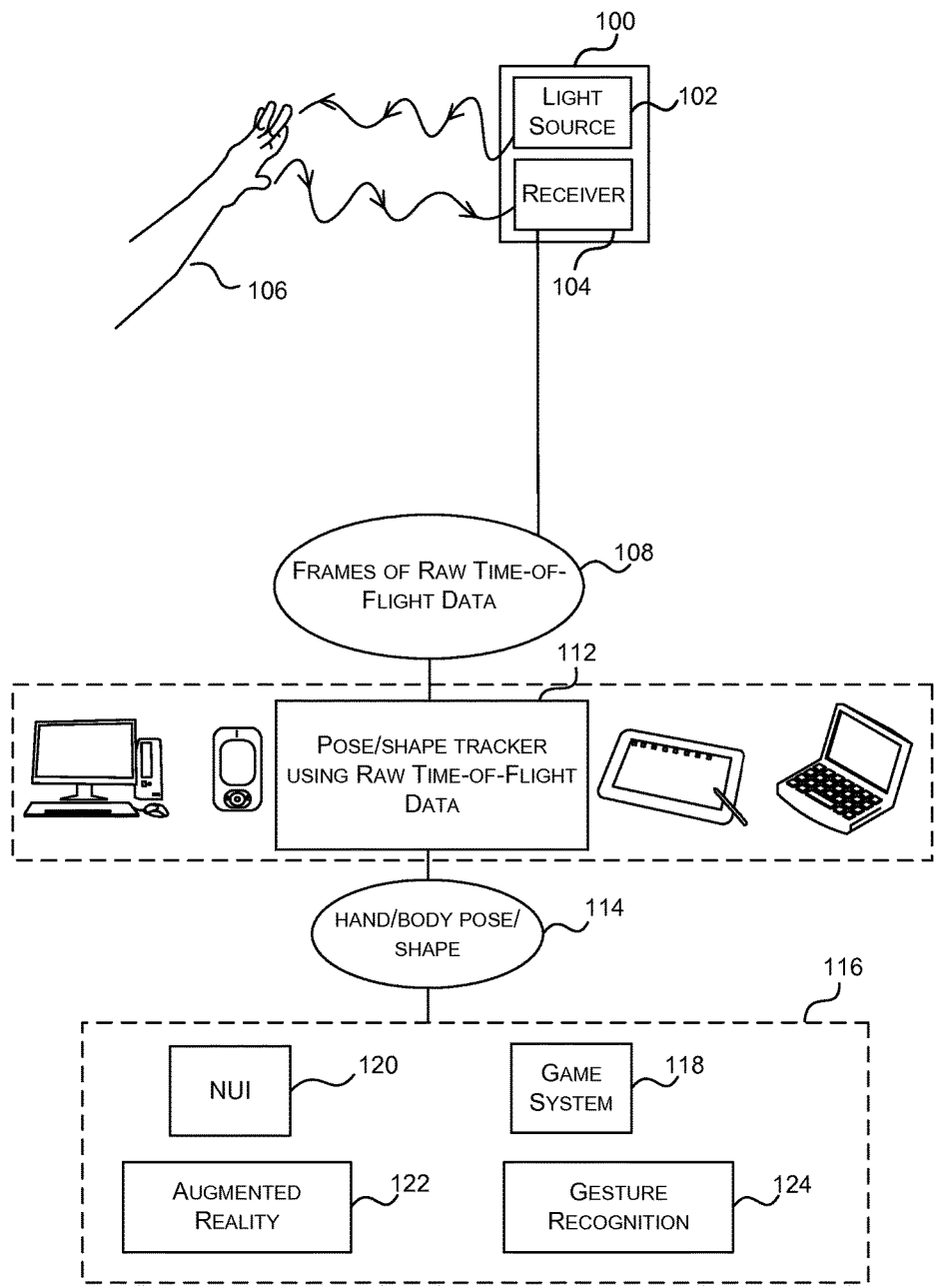
FIG. 1 is a schematic diagram of a time of flight camera capturing raw image data of a user's hand in the environment, and of a tracker which computes parameters of the hand from the raw time of flight image(s)

FIG. 1 is a schematic diagram of a time of flight camera 100 capturing raw image data 108 of a user's hand 106 making complex hand poses in the environment, and of a tracker 112 which computes pose and/or shape 114 of the hand from frames of raw time of flight data 108 captured by the camera 100. In this example, one hand 106 is shown. However, in practice there may be any one or more objects, or parts of objects, in the field of view of the camera 100. For example, there may be multiple hands in the scene, from one or more users. In another example, players of a game have body pose tracked by the tracker. In another example, an object such as a coffee mug is in the field of view of the camera and its pose and/or shape is computed.

Although the example of FIG. 1 is concerned with tracking parameters of a user's hand, the methods and apparatus described in this document can also be used to track 3D model parameters of other entities such as faces, whole bodies, or other rigid or deformable objects.

By computing pose and/or shape (or other 3D model parameters) directly from raw time of flight images, without the need to compute depth from the raw time of flight data various benefits are gained. For example, speed of 3D model parameter tracking can be increased because computing pose, shape or other parameters directly from raw time of flight can be less computationally intensive than computing depth from the raw time of flight and then using the depth to compute pose or shape or other quantities. Accuracy of 3D model parameter tracking is improved. This is because the raw time of flight images are typically less noisy than depth maps computed from the raw time of flight images. By computing parameters directly from the raw time of flight images the effects of noise on the resulting tracked parameters are reduced.

Parameters of a 3D model of an object, or part of an object comprise at least pose parameters and/or shape parameters. The term "pose" is used to refer to a global position and global orientation of an object, or part of an object. Where the object is articulated, such as a hand or human body, the pose may also comprise a plurality of joint angles of a kinematic model of the articulated object. For example, hand pose may comprise more than 10 or more than 20 degrees of freedom depending on the detail and complexity of a kinematic hand model used. In some examples the pose is represented as a vector of pose parameters.

It is recognized herein that computing depth from the raw sensor data 112 is resource intensive in terms of computational resources such as memory and processing capacity, and also in terms of time. The new processing pipeline of FIG. 1 enables computational resources and memory to be allocated in a more efficient manner. This is achieved by enabling the tracker 112 to fit a 3D model of the entity being tracked directly to raw time of flight image data without the need to compute depth.

A raw image from a time of flight sensor is a plurality of sensor measurements, such as illumination intensity values, shutter timings, phase measurements. In an example where a phase modulation time of flight camera is used, a plurality of raw images, one for each of a plurality of modulation frequencies, may be sensed for a single frame of the time of flight sensor. In an example where a gated time of flight camera is used, a plurality of raw images, one for each of a plurality of exposure periods may be sensed for a single frame of the time of flight sensor. In some examples, a raw image from a time of flight sensor is an ambient image which captures light during a time when the active illumination of the time of flight camera is off.

The parameter values 114 from the tracker 112 are input to a downstream system 116 such as a natural user interface 120, a game system 118, an augmented reality system 122, or a gesture recognition system 124. These are examples only and other downstream systems 116 may be used. In the example of FIG. 1 the parameter values 114 are pose and/or shape parameters. However, other types of parameter may be used.

The tracker 112 may be integral with the time of flight camera 100 in whole or in part. The tracker 112 may be part of an end user computing device such as a PC, smart phone, tablet computer or laptop. In some examples some or all of the tracker 112 is located in the cloud and is accessible to end user devices such as end user computing devices.

In the examples shown in FIG. 1 the tracker 112 is shown outside the time of flight camera 100 for clarity. However, the tracker 112 may be integral, in whole or in part, with the time of flight camera. This is explained below with reference to FIG. 6. In other examples the tracker 112 is in a computing device (such as that of FIG. 8) that is able to receive data from the time of flight camera, for example using a wired or wireless communication link or in other ways. In some examples the tracker is located at a computing device in the cloud.

The time of flight camera 100 may be a phase modulation time of flight camera or a gated time of flight camera which uses shutter timings. It comprises a light source 102 and a receiver 104. Other types of time of flight camera may also be used.

In the case of a phase modulation time of flight camera the light source 102 emits modulated light. In an example, the source 102 of modulated light may be an incoherent light source which emits transmitted light 106 that is modulated with a signal at a modulation frequency $f_{mod}$. In an example the light from the device may be modulated at a high frequency e.g. a frequency in the MHz range, such that the amount of illumination changes periodically. In an example the periodic change of illumination may take the form of a sinusoid function.

In a phase modulation time of flight example, the source 102 of modulated light emits light at multiple modulation frequencies, for example three modulation frequencies. The light source 102 may be selected so that the wavelength of the emitted light is the most appropriate wavelength for a particular application. In an example the light source may be a non-visible light source e.g. a near infra-red light source. In another example the light source may be a visible light source. In an embodiment the light source may be selected to be a source of light of an appropriate wavelength for the application for which it is intended.

In the case of a gated (also referred to as pulse-based) time of flight camera, the light source 102 emits extremely short pulses of illumination. For example using a powerful laser light source which emits pulses of light of picosecond duration. In the case of gated time of flight camera, the receiver 104 comprises a high speed range sensor with resolution capable of resolving the short pulses of the light source 102. For example, the receiver 104 has picosecond resolution.

The light source 102 may illuminate an object 106 within the field of the camera and at least some of the light is reflected back toward the camera from the object. In an example the detected object may be a person or part of a person as in the example of FIG. 1; however parameters may be computed of any object or part of an object. The reflected light 110 may be detected by the receiver 104.

In phase modulation time of flight, the reflected light is also modulated and the reflected light 110 may be out of phase with the transmitted light due to the delay caused by the distance the light has travelled on the return trip between the camera and the object. In phase modulation time of flight, each pixel of the receiver 104 the amplitude and phase difference of the received signal relative to the transmitted light may be determined for each recorded channel. Three or another number of recording channels, each with its own phase shift may be used.

In gated time of flight, the amount of reflected light that a pixel of the receiver 104 registers is measured for one or more different exposure periods. An exposure period is a time interval during which pixels of a photosensor of the time of flight camera 100 are actively sensing (as opposed to being "switched off"). The amount of light reflected from a surface in the field of view during the exposure periods is used to calculate distance of a surface from the camera. This may be done by comparing the amount of reflected light sensed with a model of the camera behavior obtained during a calibration process.

Figure 2:
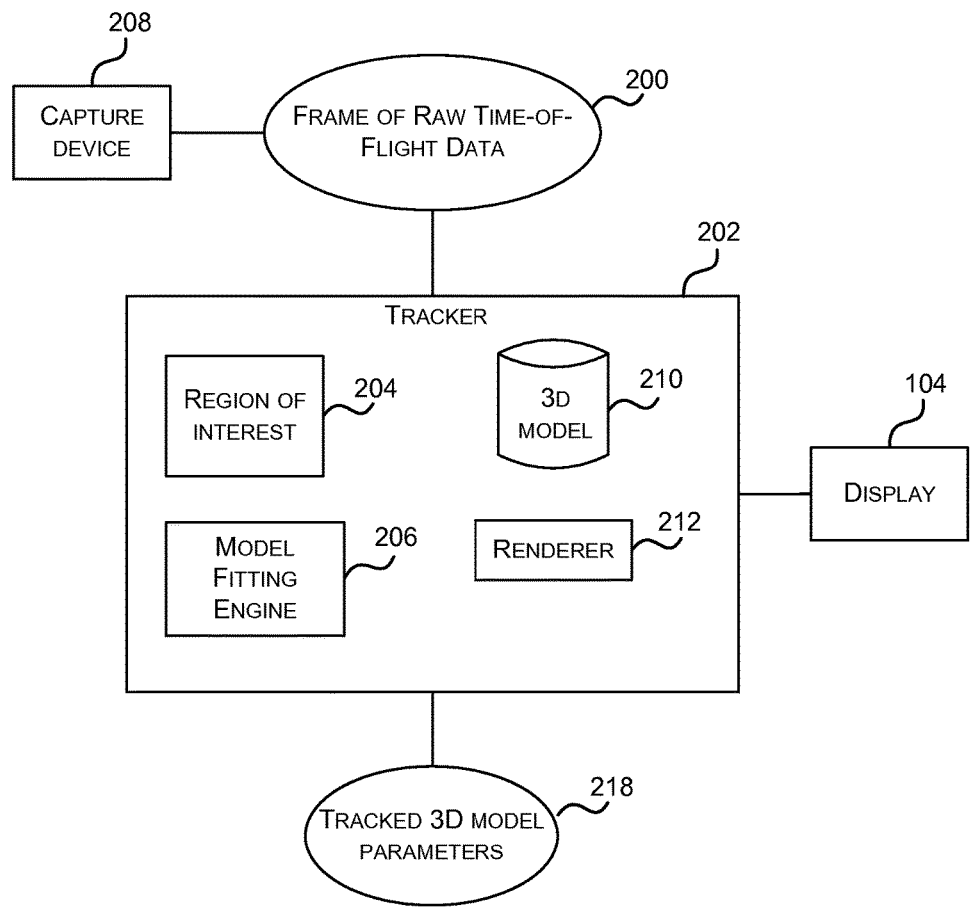
FIG. 2 is a schematic diagram of the tracker of FIG. 1 in more detail.

FIG. 2 is a schematic diagram of a computer-implemented tracker 202 such as the tracker of FIG. 1. The tracker 202 takes as input at least one frame of raw time of flight data 200. In some examples, a stream of frames is input. The input frames are from at least one capture device 208 which comprises at least one time of flight camera and may also comprise other types of camera such as an RGB video camera.

The tracker 202 produces as output a stream of tracked parameter values 218, where the parameters are parameters of a 3D model of the entity depicted in the images. For example, the parameters may be pose or shape. In an example pose is expressed as a vector (or other format) of values, one for each degree of freedom of the pose being tracked. For example, 10 or more, or 20 or more values. In one example, the pose vector comprises 3 degrees of freedom for a global rotation component, 3 degrees of freedom for a global translation component, and 4 degrees of freedom for each of a plurality of joint transformations). The joint transformations may be specified in a kinematic model of the hand which may or may not be anatomically valid.

In some examples the model parameters 218 comprise shape parameters, parameterized as direct scalings on joints of a kinematic model. In some examples the model parameters 218 comprise shape parameters using a parametric shape basis that contains degrees of freedom corresponding to global size, finger thickness, finger length or other quantities.

In some examples the tracker 202 sends output to a display 104 such as the display shown in FIG. 1 although this is not essential. The output may comprise a synthetic image of the object being tracked, rendered from a 3D model according to a current tracked pose and/or shape of the object.

The tracker 202 comprises a region of interest component 204 (which is optional), a model fitting engine 206, a renderer 212 and a 3D model 210 of the type of object being tracked.

The region of interest component 204 processes the raw data, for example, to extract a foreground region depicting a user's hand or body or other object of interest. Any well-known foreground extraction technology may be used. For example, the foreground extraction technology may use color information in color images captured by the capture device 102 to detect and extract image elements depicting the user's hand.

The 3D model 210 is any 3D model of the type of object for which parameters are to be tracked. There may be more than one 3D model in the case of multiple types of object. In some examples the 3D model is a triangle mesh model although other types of 3D models may be used.

The renderer 212 may be implemented using a graphics processing unit or any other suitable technology. The renderer is a new type of renderer which is able to render synthetic raw time of flight images from a 3D model 210 using candidate parameter values. In some examples the 3D model is a triangle mesh model of a hand or body in a base pose although other types of 3D models may be used. The renderer is described in more detail below with reference to FIG. 5.

The model fitting engine 206 searches for a good fit between the 3D model 210 and the observed raw time of flight data 200 using a comparison process. For example, by rendering synthetic raw time of flight images from the model and comparing those with the observed raw time of flight data.

Alternatively, or in addition, the functionality of the tracker can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
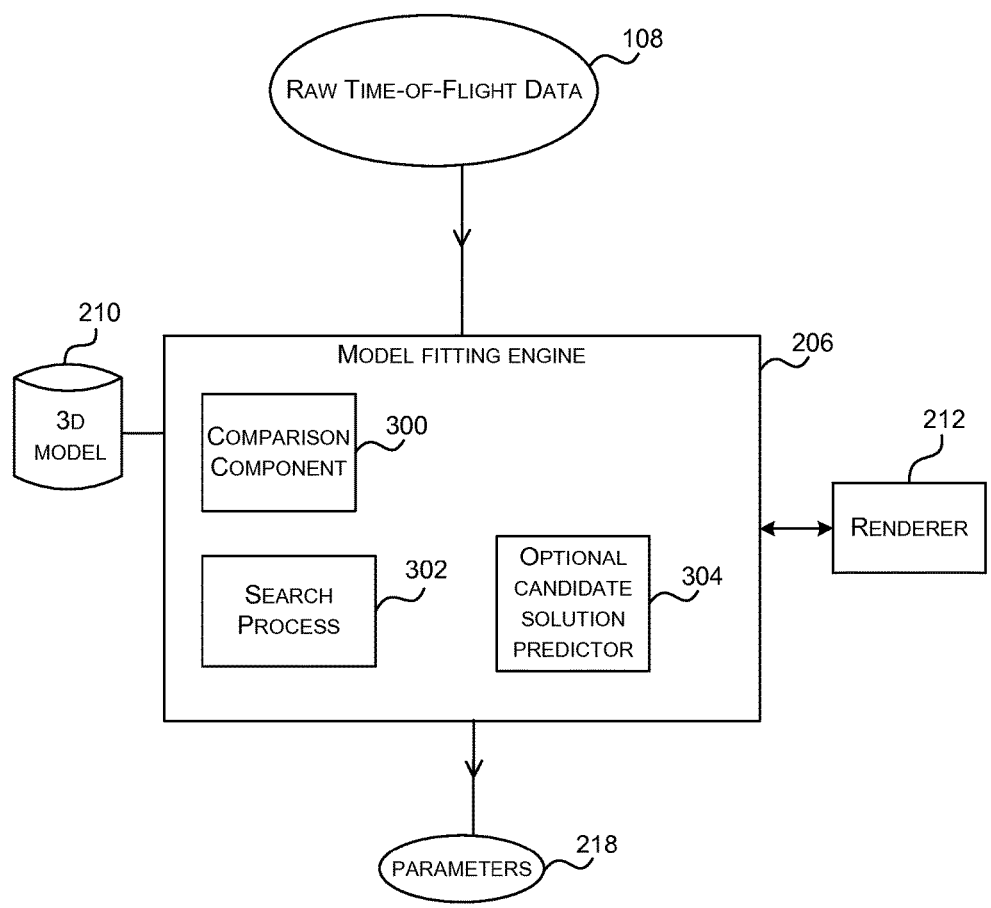
FIG. 3 is a schematic diagram of the model fitting engine of FIG. 2 in more detail.

With reference to FIG. 3 the model fitting engine 206 comprises a comparison component 300, a search process 302 and, optionally, a candidate solution predictor 304. The model fitting engine has access to the 3D model 210 and is in communication with the renderer 212. It receives raw time of flight data 108 which may be whole frames of raw time of flight data, or regions of interest extracted from the raw time of flight data. It calculates, per frame of raw time of flight data 108, parameter values 218 of an object depicted in the time of flight data.

The search process 302 searches possible parameter values to find a good solution. An assessment of the quality of a set of parameter values is made using the comparison component 300.

The comparison component 300 uses a distance metric or distance function to assess how well the model 210 and the observed raw time of flight data agree for a particular set of parameter values. For example, the metric may comprise computing a sum over image pixels of the absolute or squared difference between the rendered image and the observed image. In some examples the sum has a robust penalty term applied such as Geman-McClure, or Cauchy, to help reduce the effect of outliers. In another example the distance metric is related to a pixel-wise L1 norm or L2 norm. More detail about the comparison component is given later.

The search process 302 may comprise one or more search algorithms to facilitate search for a good set of parameter values. For example, the search process may use a stochastic optimizer which is an iterative process for finding a good candidate set of parameter values from a pool of candidate parameter values, by iteratively refining the pool and randomly generating candidate values. In some examples, the stochastic optimizer may be a particle swarm optimizer, a genetic algorithm process, a hybrid of a particle swarm optimizer and a genetic algorithm process, or any other stochastic optimizer which iteratively refines a pool of candidate values. A particle swarm optimizer is a way of searching for a solution to a problem by iteratively trying to improve a candidate solution in a way which takes into account other candidate solutions (particles in the swarm). A population of candidate solutions, referred to as particles, are moved around in the search-space according to mathematical formulae. Each particle's movement is influenced by its local best known position but, is also guided toward the best known positions in the search-space, which are updated as better positions are found by other particles. This is expected to move the swarm toward the best solutions. A genetic algorithm process is a way of searching for a solution to a problem by generating candidate solutions using inheritance, splicing, and other techniques inspired by evolution.

The search process may employ a gradient-based optimizer such as the Levenberg-Marquart algorithm or L-BFGS. However, this is not essential.

The search process may search candidate parameter values which are generated at random (as mentioned above) and/or which are predicted by the candidate solution predictor 304. For example, the candidate solution predictor may use historical data about a pose and/or shape calculated from a previous frame, and perturb the historical pose and/or shape to create a predicted pose and/or shape. In another example, the candidate solution predictor may use a motion model, which describes how the object being tracked is expected to move. The motion model may be used to predict candidate pose solutions. In another example, the candidate solution predictor predicts candidate poses and/or candidate shapes by using a machine learning component which has been trained to learn associations between raw time of flight data and pose and/or shape of an object depicted in the raw time of flight data.

Figure 4:
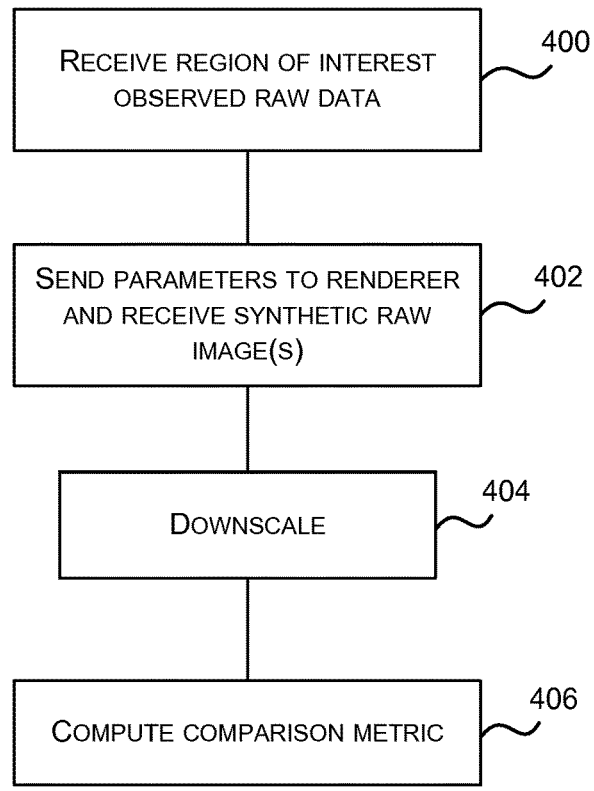
FIG. 4 is a flow diagram of a method at a comparison component such as that of FIG. 2.

FIG. 4 is a flow diagram of a method at the comparison component. It receives 400 a region of interest of observed raw time of flight data. The comparison component sends 402 the parameter values for which a comparison (or quality score) is desired, to the renderer and receives in reply one or more synthetic raw images. For example, it may receive one synthetic raw image for a single channel (where a channel is a modulation frequency or an exposure period), or may receive multiple synthetic raw images for different channels associated with one synthetic frame.

In some examples the comparison component downscales 404 the observed raw time of flight data, in order to reduce noise in the observed raw time of flight data. However, downscaling is not essential. In some examples the comparison component subsamples the observed raw time of flight data. However, subsampling is not essential. In some examples, power is saved by arranging the time of flight camera to capture only a subsample of the raw data—i.e. by making only a sub-sample of the pixel locations of the sensor active.

The comparison component computes 406 a comparison metric between the observed raw time of flight data (which may have been downscaled or subsamples) and the synthetic raw image(s). Where there are a plurality of synthetic raw images for different channels, the observed data is compared with each synthetic raw image in turn and the results aggregated. Alternatively the synthetic raw images are aggregated first and then the comparison is made.

Figure 5:
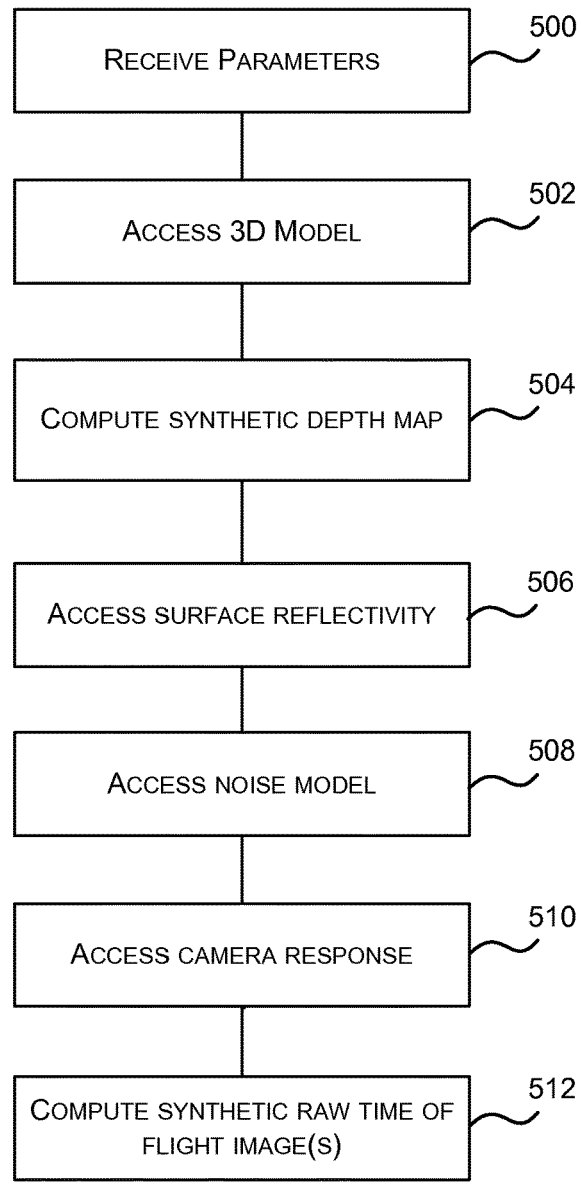
FIG. 5 is a flow diagram of a method at a renderer for rending synthetic raw time of flight images.

More detail about the renderer 212 is now given with reference to FIG. 5. The renderer may compute a synthetic raw time of flight image according to the following equation:

$$\vec{R}(d,\rho)=\rho\vec{C}(d)$$

which may be expressed in words as, a rendered image $\vec{R}$ output by the renderer 212, where the renderer uses parameters d (denoting depth) and ρ (denoting surface reflectivity), is equal to the surface reflectivity times the ideal response of the time of flight camera, denoted by $\vec{C}(d)$. An ideal response of a time of flight camera is a function describing how the camera sensor outputs behave as the distance d of the surface reflecting the received light varies from the sensor, in the absence of noise.

In practice noise is present. Thus in some examples the renderer 212 takes noise into account by adding noise to the rendered image and this may be denoted by $\vec{\varepsilon}(\vec{R})$. However, it is not essential to take noise into account.

Noise includes at least stochastic shot noise, which occurs due to the quantized nature of the received light and cannot be reduced, and read noise which occurs as a result of converting an analog signal received at the camera sensor into a digital signal. Other types of noise may also be present. All or some of these types of noise together may be denoted by the symbol ε in this document. The shot noise component of the combined noise ε may be known by the renderer 212. For example, the shot noise component is calculated during a calibration phase during manufacture of the time of flight camera. Read noise varies, for example, according to the size of a pixels of the sensor, the type of semiconductor used in the sensor, and the ambient temperature and other environmental conditions. In some examples the renderer 212 uses a noise model which takes into account both read noise and shot noise. For example, a Poissonian-Gaussian noise model may be used or any other suitable noise model.

The surface reflectivity p depends on characteristics of the material of the surface from which light reflects into the time of flight camera as well as the surface orientation with respect to the light source and camera position. The renderer 212 may have a library of surface reflectivity functions for different types of surface, such as skin, hair, clothing, carpet, shiny floor tiles, laminated tables, and others. These function values are typically each less than 1 as most domestic materials reflect less light than they receive. The 3D model may be associated with information about surface types so that the renderer is able to look up appropriate surface reflectivity values according to the type of surface being modelled.

The renderer receives parameters 500 such as a pose and optionally also shape parameters and accesses 502 the 3D model. It computes 504 a synthetic depth map using well-known renderer technology. In some examples the renderer 212 takes occlusion into account when it computes the synthetic depth map. This is achieved using well-known renderer technology such as z-buffering or the painter's algorithm. A depth map is an image where each pixel comprises a depth value representing a distance from the camera to a surface in the scene viewed by the camera. The synthetic depth map provides the values d in the above equation. The renderer 212 is then able to access the surface reflectivity 506 (for example, using a texture map), a noise model 508 (if used) and the camera response 510. The renderer uses this data in the above equation to compute 512 a plurality of synthetic raw time of flight images $\vec{\varepsilon}(\vec{R})$. For example, one for each of a plurality of different exposure periods in the case of gated time of flight cameras. For example, one for each of a plurality of different phase shifts in the case of phase modulated time of flight cameras. In the case of different exposure periods the renderer uses a different ideal camera response for different exposure periods. In the case of different modulation frequencies the renderer uses a different ideal camera response for the different modulation frequencies. The ideal camera response is different, for the different recording channels, because the recording channels are at different phases/frequencies with respect to the emitted light. The noise may be different for all recording channels.

In an example a noise model N is used to specify the likelihood of the observed time of flight data $\tilde{R}_i$ on channel i to the ideal noise-free response $R_i$ given the image rendered by the renderer for channel i.

$$\tilde{R}_i \sim N(\tilde{R}_i | R_i)$$

In the mathematical expressions herein, the ~ symbol means "simulated from", which means a realized sample of a probability distribution.

The comparison component may compare the observed time of flight data $\tilde{R}_i$ and the synthetic data by computing a maximum likelihood as follows:

Maximize over the pose parameters θ, a sum over pixels within the region of interest, of the sum over channels, of the log of the output of the noise model N given as parameters the observed raw time of flight data, and the renderer output.

$$\max_{\theta} \sum_{pixels} \sum_i \log N(\tilde{R}_i | R_i(\theta))$$

As the complexity of the process of computing the synthetic raw time of flight data increases there is an increased computational burden. Therefore in some examples, one or more of the following aspects of the process of computing the synthetic raw time of flight data are omitted:

Surface reflectivity

Noise model of camera in order to trade off accuracy against speed of tracking.

In some examples the renderer 212 gives a more detailed simulation of the raw time of flight images based on ray-tracing rather than the process described above with reference to FIG. 5. In this case no depth map is directly computed. In this example the renderer 212 calculates simulated rays of light which are fired into the scene, bounce off the 3D model or other surfaces known to be in the scene, and eventually reflect back into the time of flight sensor. A ray tracer at the renderer 212 records the distance traveled for each ray, and computes an estimate of the camera response or phase offset. This allows for noisy effects such as multi-path reflection and so gives accurate results.

Figure 6:
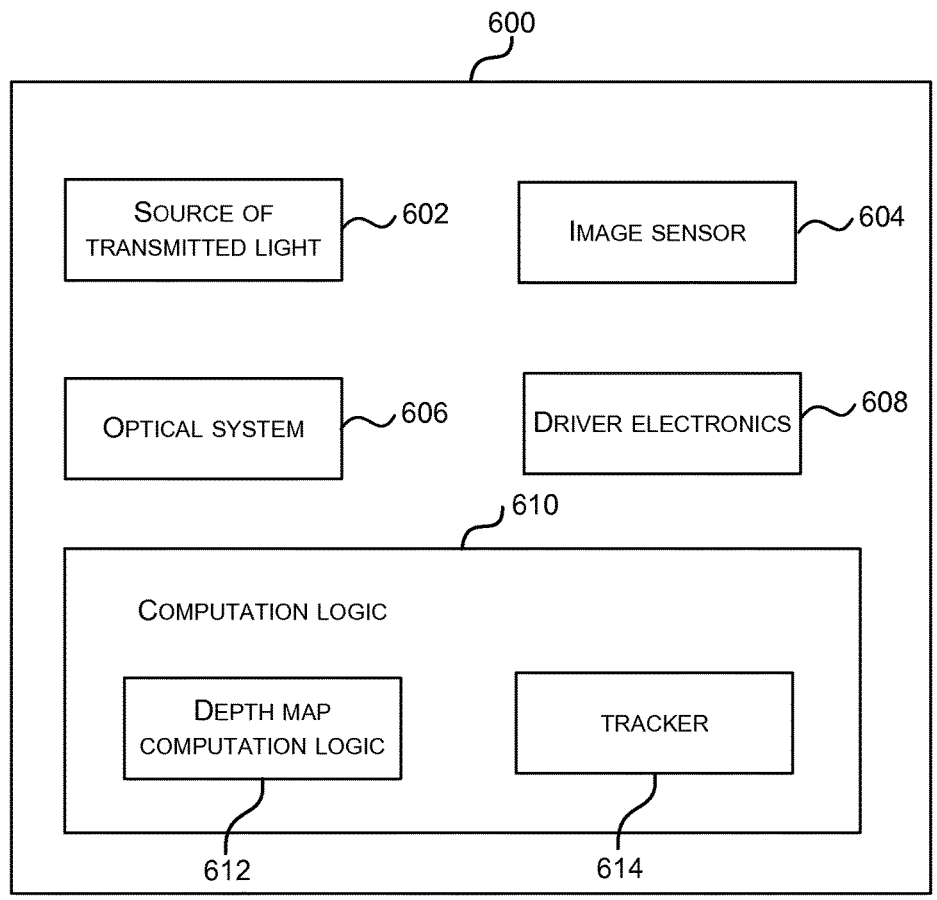
FIG. 6 is a schematic diagram of a time of flight camera.

FIG. 6 is a schematic diagram of a time of flight depth camera 600 which may be a phase modulation time of flight depth camera or a gated time of flight depth. The time of flight camera 600 comprises a source of transmitted light 602. In an example the source of transmitted light is an incoherent light source. In another example the source of transmitted light is a coherent light source. An example of an appropriate light source is a near infra-red laser or LED however another appropriate light source may be used. In the case of a phase modulated time of flight camera the transmitted light may be modulated at a modulation frequency. In an example the modulation frequency may be an RF frequency in the range kHz-GHz, for example the modulation frequency may be in the MHz range. In the case of a gated time of flight camera the transmitted light may be pulsed where the pulses may be of picosecond duration.

A time of flight depth camera may further comprise an image sensor 604 that receives light reflected from objects within the scene. The image sensor 604 may comprise a CCD sensor, a CMOS sensor, for example a Photonic Mixer Device (PMD) sensor or other appropriate sensor which may be arranged to detect light reflected from objects, people and surfaces within the camera range. In the case of a gated time of flight camera the image sensor 604 has a resolution compatible with the duration of the pulses emitted by the light source.

The camera may further comprise an optical system 606 that is arranged to gather and focus reflected light from the environment on to the image sensor 604. In an example the optical system may comprise an optical band pass filter, which may enable only light of the same wavelength as the light source to be received by the sensor. The use of an optical band pass filter may help to suppress background light. The camera may also comprise driver electronics 608 which control both the light source and an image sensor, for example, to enable highly accurate phase difference measurements to be made or to enable a train of light pulses to be emitted and for the image sensor to be "shuttered" on and off. An image sensor may be shuttered on and off electronically rather than with physical shutters.

In one example the camera may comprise computation logic 610. In an embodiment computation logic may be arranged to execute the methods described herein with reference to FIGS. 4, 5 and 7.

Computation logic may further comprise integrated depth map computation logic 612 and tracker 614. In an example depth map computation logic 612 may be arranged to estimate a distance of an object from the difference in phase between light transmitted from the light source and the light received at the receiver. In another example depth map computation logic 612 may be arranged to estimate a distance of an object from the similarity between the amount of light sensed during an exposure period, and a model of the camera's behavior.

Alternatively, or in addition, the functionality of FIG. 6 can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 7:
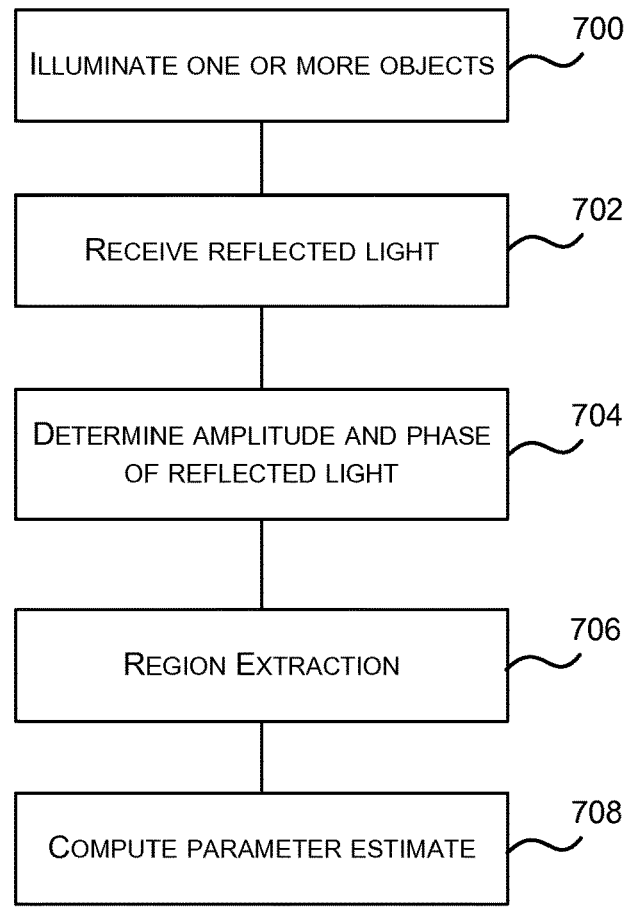
FIG. 7 is a flow diagram of a method of computing 3D model parameters at the time of flight camera of FIG. 6.

FIG. 7 is a flow diagram of a method of operating the time of flight camera of FIG. 6. A light source at a time of flight depth camera illuminates 700 one or more nearby objects. In the case of a phase modulation time of flight camera, the light source is modulated at one or more frequencies. In the case of a gated time of flight camera the light source is pulsed. Light that is reflected from nearby objects is received 702. Raw sensor data is received. In the case of a phase modulation time of flight camera the raw sensor data comprises, for example, infra-red intensity images in at least one modulation frequency. In this case amplitude and phase measurements are computed 704 from the intensity images.

In the case of a gated time of flight camera the raw sensor data comprises, infra-red intensity images at at least one exposure period. In this case step 704 is omitted.

In some examples, where a single frame of raw sensor data comprises images on a plurality of different channels, the images may be aggregated across the channels. The aggregated data may then be used for the model fitting process.

In other examples, where a single frame of raw sensor data comprises images on a plurality of different channels, model fitting (i.e. model parameter value estimation) is carried out separately for each channel. For example, within a single frame, each channel is received at a slightly different time (each in succession) and may have a time stamp associated with it. The tracker receives the raw image data on a plurality of channels, each having a different time stamp, and carries out rendering, comparing (comparing the rendered image and the raw region of interest) and calculating (calculating the model parameter values) for each channel independently. By fitting the 3D model to each of these time steps independently (with knowledge of the time stamps of the raw images) it is possible to effectively increase the frame rate of the model fitting considerably. This gives a more accurate and smoother result.

At least part of the raw sensor data (received at step 702) for a single frame may be input to a region extractor which detects zero, one or more regions of interest in the raw time of flight images. A region of interest is an area of an image for which the majority of pixels depict parts of a scene with specified characteristics, for example, a hand, a foreground, a body. It is not essential to use a region extractor. If a region extractor is used, any well-known region extraction process may be used.

The raw sensor data for the regions of interest from step 702 is processed to compute 708 parameters such as pose and/or shape of an object for each of the regions of interest detected. For example, the raw sensor data (aggregated over channels in some examples) is input to a model fitting engine such as that of FIG. 2 and used to compute 708 parameters of a 3D model of an object depicted in the sensor data as described herein. Only one received channel may be used in some examples.

Thus in various examples the method of FIG. 7 is used to compute parameter estimates 708 without the need to compute depth. In this way only one received channel is needed. For example, one phase modulation frequency in the case of phase modulated time of flight. For example, one exposure duration in the case of gated time of flight. By using fewer received channels in this way, power consumption and/or manufacturing/running costs are reduced. By using fewer received channels it is possible to increase the frame rate of the time of flight camera whilst still achieving operation of the method of FIG. 7 at a speed compatible with the frame rate of the time of flight camera.

In examples where three or more receiving channels are available, depth may also be computed from the time of flight data, in addition to the parameter estimate 708. In the case of a phase modulated time of flight camera, a depth map computation logic (612 of FIG. 6 or 810 of FIG. 8) may be arranged to compute a depth map from the measured amplitude and phase of the reflected light by computing a distance measurement for each pixel of the camera receiver. The amplitude of the light received at each pixel can be used to generate an intensity map, or 2-D image. The depth of objects from the camera may be determined from a phase shift of the reflected light relative to the transmitted light. Given that the speed of light is a known constant, the depth of an object (in meters) may be computed from the phase shift (in radians) as:

$$d = \frac{c}{2f_{mod}} \cdot \frac{\varphi}{2\pi}$$

where c in meters/second is the speed of light, $f_{mod}$ in MHz is the modulation frequency and $\varphi$ is the phase shift in radians. Therefore, an intensity and distance may be determined for each pixel of the receiver and a depth map may be generated at a resolution dependent on the resolution of the receiver i.e. a depth map generated from modulated light received at a receiver with 10000 pixels will have a higher resolution than a depth map generated from modulated light received at a receiver with 1000 pixels.

The quantity $c/(2f_{mod})$ is the maximum distance that can be measured unambiguously by the depth camera if only a single frequency is used. Therefore the one or more modulation frequencies may be selected to provide a distance measurement that is most appropriate for the application being used. In one example, where the depth camera is used with a gaming system, the one or more modulation frequencies may be selected to provide maximum unambiguous distance measurements which are approximately equivalent to the dimensions of a room. For example if the maximum unambiguous distance measurement required was in the range 4-10 meters the modulation frequencies may be selected to be in the range 15-37.5 MHz. However, in another example multiple modulation frequencies may be combined to give an unambiguous measurement.

In the case of a phase modulated time of flight camera, a depth map computation logic (612 of FIG. 6 or 810 of FIG. 8) may be arranged to compute a depth map from the measured intensities of the reflected light in the different exposure periods by computing a distance measurement for each pixel of the camera receiver. This is done by comparing the measured intensities with one or more models of the camera behavior obtained in a calibration phase.

Figure 8:
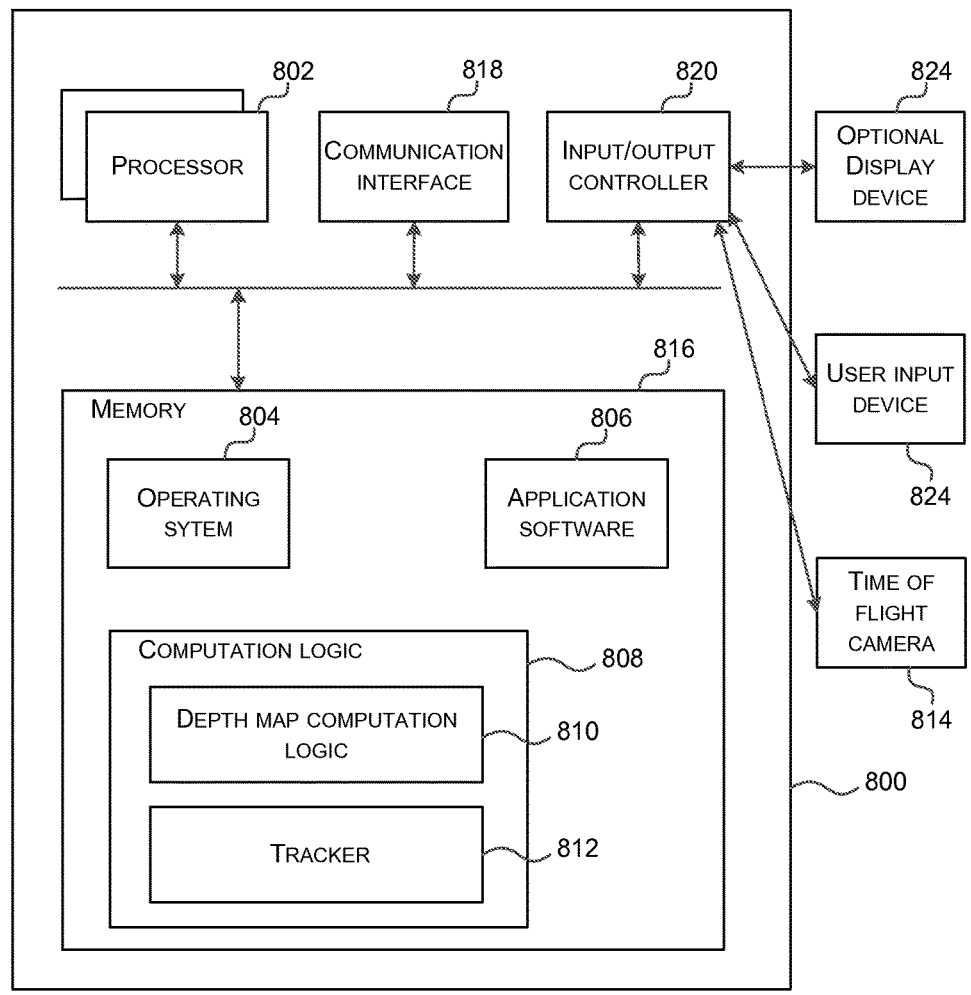
FIG. 8 illustrates an exemplary computing-based device in which embodiments of a tracker and optional depth map computation logic may be implemented.

FIG. 8 illustrates various components of an exemplary computing-based device 800 which may be implemented as any form of a computing and/or electronic device, and in which embodiments of parameter tracking from raw time of flight images may be implemented.

Computing-based device 800 comprises one or more processors 802 which may be microprocessors, controllers or any other suitable type of processors for processing computer executable instructions to control the operation of the device in order to detect regions of interest in time of flight images. In some examples, for example where a system on a chip architecture is used, the processors 802 may include one or more fixed function blocks (also referred to as accelerators) which implement a part of the method of parameter tracking from raw time of flight images in hardware (rather than software or firmware). For example, computation logic 808 for computing depth maps and parameter tracking may be implemented in hardware. Platform software comprising an operating system 804 or any other suitable platform software may be provided at the computing-based device to enable application software 806 to be executed on the device. In an example computing-based device 800 may further comprise computation logic 808. Computation logic 808 may further comprise integrated depth map computation logic 810, and tracker 812. In an example depth map computation logic 810 may be arranged to estimate a distance of an object from the difference in phase between light transmitted from the light source and the light received at the receiver, or on the basis of shutter timings.

The computer executable instructions may be provided using any computer-readable media that is accessible by computing based device 800. Computer-readable media may include, for example, computer storage media such as memory 816 and communications media. Computer storage media, such as memory 816, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 816) is shown within the computing-based device 800 it will be appreciated that the storage may be distributed or located remotely and accessed via a network or other communication link (e.g. using communication interface 808).

The computing-based device 800 also comprises an input/output controller 820 arranged to output display information to a display device 824 which may be separate from or integral to the computing-based device 800. The display information may provide a graphical user interface. The input/output controller 820 is also arranged to receive and process input from one or more devices, such as time of flight camera 814 and a user input device 822 (e.g. a mouse, keyboard, camera, microphone or other sensor). In some examples the user input device 822 may detect voice input, user gestures or other user actions and may provide a natural user interface (NUI). In an embodiment the display device 824 may also act as the user input device 822 if it is a touch sensitive display device. The input/output controller 820 may also output data to devices other than the display device, e.g. a locally connected printing device (not shown in FIG. 8).

Any of the input/output controller 820, display device 824 and the user input device 822 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

An example provides a method of tracking parameters of an entity comprising:
  receiving raw image data depicting the entity from a time of flight camera;
  accessing a 3D model of the entity, the 3D model having model parameters;
  rendering, from the 3D model having specified values of the model parameters, simulations of raw time of flight image data depicting the entity;
  comparing the simulated raw image data and at least part of the received raw image data;
  calculating, on the basis of the comparison, values of the tracked parameters of the entity.

For example, the values of the tracked parameters of the entity are calculated without the need to compute depth from the received raw image data.

For example, the tracked parameters comprise any of: pose parameters, shape parameters.

In an example the above method comprises receiving the raw image data in the form of one or more intensity images associated with modulation frequencies of light emitted by the time of flight camera, or associated with exposure periods of the time of flight camera.

For example receiving the raw image data from only one channel. Such as a phase modulation frequency or an exposure duration.

For example receiving the raw image data on a plurality of channels and aggregating the data across channels before making the comparison.

In an example, the process receives the raw image data on a plurality of channels, each having a different time stamp, and carries out the rendering, comparing and calculating for each channel independently.

In an example, calculating the values of the tracked parameters of the entity comprises searching for the values of the tracked parameters of the entity amongst many possibilities by repeating the comparison.

In an example the above method comprises rendering the simulations by rendering a depth map from the 3D model according to the specified values of the model parameters, and using the depth map to compute the simulations.

In an example the method comprises rendering the depth map in a manner which takes into account occlusions.

In an example the method comprises using the depth map to compute the simulations in a manner which takes into account surface reflectivity of the entity.

In an example using the depth map to compute the simulations comprises inputting the depth map to a camera response function of the time of flight camera, the camera response function describing behavior of sensors of the camera as the depth of surfaces reflecting light into the camera varies.

In an example the method comprises using the depth map to compute the simulations in a manner which takes into account a noise model of the camera.

In an example the method comprises rendering the simulations by calculating simulated rays of light which are fired into a scene, bounce off the 3D model or other surfaces known to be in the scene, and eventually reflect back into the time of flight camera.

An example method compares the simulated raw image data and the received raw image data by computing a sum over image pixels of the absolute or squared difference between the simulated raw image data and the received raw image data and applying a robust penalty term.

Some examples comprises downscaling or subsampling the received raw image data prior to comparing the simulated raw image data and the received raw image data.

Another example provides a computing system comprising:
  an input/output controller arranged to receive raw image data depicting an entity, the raw image data being from a time of flight camera;
  a memory storing a 3D model of the entity, the 3D model having model parameters; and
  a model fitting engine arranged to obtain simulations of raw time of flight image data depicting the entity, the simulations having been rendered from the 3D model of the entity with specified values of the model parameters;
  the model fitting engine arranged to compare the simulated raw image data and the received raw image data and to calculate, on the basis of the comparison, the parameters of the entity.

For example the model fitting engine comprises a renderer to render the simulations.

For example the renderer comprises a camera response function of the time of flight camera.

The computing system may be integrated in a time of flight camera.

Another example provides a computer readable medium storing instructions which when executed by a computing device control the device to:
  receive raw image data depicting the entity from a time of flight camera;
  access a 3D model of the entity, the 3D model having model parameters;
  render, from the 3D model having specified values of the model parameters, simulations of raw time of flight image data depicting the entity;
  compare the simulated raw image data and at least part of the received raw image data;
  calculate, on the basis of the comparison, parameters of the entity without the need to compute depth from the received raw image data.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of tracking parameters of an entity of a first type comprising:
    receiving, from a time of flight camera, first raw image data depicting the entity;
    accessing a stored 3D model of the first type of entity, the 3D model having tracked model parameters;
    selecting candidate values for the tracked model parameters, wherein the selection comprises:
        selecting a first set and second set of candidate values;
        rendering, from the 3D model using the first set and second set of candidate values, respective second and third simulated raw time of flight image data, the second and third simulated raw time of flight image data including historical data that is perturbed to generate a first and second predicted pose corresponding to the 3D model with the first and second set of candidate values respectively;
    comparing the second simulated raw time of flight image data and at least part of the received first raw image data and the third simulated raw time of flight image data and the at least part of the received first raw image data; and
    determining that the second simulated raw time of flight image data corresponding to the 3D model with the first set of candidate values used to generate the first predicted pose is closer to the first raw image data than the third simulated raw time of flight image data corresponding to the 3D model with the second set of candidate values used to generate the second predicted pose; and
    in response to determining that the second simulated raw time of flight image data is closer to the first raw image data, selecting the first predicted pose as an estimated pose of the entity; and
    outputting the estimated pose of the entity.

2. The method as claimed in claim 1 wherein the values of the tracked parameters of the entity are calculated without the need to compute depth from the received raw image data.

3. The method as claimed in claim 1 wherein the tracked parameters comprise one or more of pose parameters or shape parameters.

4. The method as claimed in claim 1 comprising receiving the raw image data in the form of one or more intensity images associated with modulation frequencies of light emitted by the time of flight camera, or associated with exposure periods of the time of flight camera.

5. The method as claimed in claim 1 comprising receiving the raw image data from only one channel.

6. The method as claimed in claim 1 comprising receiving the raw image data on a plurality of channels and aggregating the data across channels before making the comparison.

7. The method as claimed in claim 1 comprising receiving the raw image data on a plurality of channels, each having a different time stamp, and carrying out the rendering, comparing and calculating for each channel independently.

8. The method as claimed in claim 1 comprising rendering the second simulated and third simulated raw time of flight image data by rendering a depth map from the 3D model according to the first and second set of candidate values of the model parameters, and using the depth map to compute the second simulated and third simulated raw time of flight image data.

9. The method as claimed in claim 8 comprising rendering the depth map in a manner which takes into account occlusions.

10. The method as claimed in claim 8 comprising using the depth map to render the second simulated and third simulated raw time of flight image data in a manner which takes into account surface reflectivity of the entity.

11. The method as claimed in claim 8 wherein using the depth map to render the second simulated and third simulated raw time of flight image data comprises inputting the depth map to a camera response function of the time of flight camera, the camera response function describing behavior of sensors of the camera as the depth of surfaces reflecting light into the camera varies.

12. The method as claimed in claim 8 comprising using the depth map to render the second simulated and third simulated raw time of flight image data in a manner which takes into account a noise model of the camera.

13. The method as claimed in claim 1 comprising rendering the second simulated and third simulated raw time of flight image data by calculating simulated rays of light which are fired into a scene, bounce off the 3D model or other surfaces known to be in the scene, and eventually reflect back into the time of flight camera.

14. The method as claimed in claim 1 comprising comparing each of the second simulated and third simulated raw time of flight image data and the received first raw image data by computing a sum over image pixels of the absolute or squared difference between the second simulated and third simulated raw time of flight image data and the received raw image data and applying a robust penalty term.

15. The method as claimed in claim 1 comprising downscaling or subsampling the received first raw image data prior to comparing each of the second simulated and third simulated raw time of flight image data and the received raw image data.

16. A computing system comprising:
a processor;
a memory storing instructions executable by the processor, the instructions, when executed by the processor, configure the computing system to perform operations including:
receiving, from a time of flight camera, first raw image data depicting an entity of a first type;
accessing a stored 3D model of the first type of entity, the 3D model having tracked model parameters;
selecting candidate values for the tracked model parameters, wherein the selection comprises:
selecting a first set and second set of candidate values;
rendering, from the 3D model using the first set and second set of candidate values, respective second and third simulated raw time of flight image data, the second and third simulated raw time of flight image data including historical data that is perturbed to generate a first and second predicted pose corresponding to the 3D model with the first and second set of candidate values respectively;
comparing the second simulated raw time of flight image data and at least part of the received first raw image data and the third simulated raw time of flight image data and the at least part of the received first raw image data; and
determining that the second simulated raw time of flight image data corresponding to the 3D model with the first set of candidate values used to generate the first predicted pose is closer to the first raw image data than the third simulated raw time of flight image data corresponding to the 3D model with the second set of candidate values used to generate the second predicted pose; and
in response to determining that the second simulated raw time of flight image data is closer to the first raw image data, selecting the first predicted pose as an estimated pose of the entity; and
outputting the estimated pose of the entity.

17. The computing system of claim 16 wherein the operations comprise: rendering the second simulated and third simulated raw time of flight image data by rendering a depth map from the 3D model according to the first and second set of candidate values of the model parameters, and using the depth map to compute the second simulated and third simulated raw time of flight image data.

18. The computing system of claim 16 integrated in a time of flight camera.

19. A non-transitory computer storage medium storing computer-executable instructions which when executed by a computing device control the computing device to:
receiving, from a time of flight camera, first raw image data depicting an entity of a first type;
accessing a stored 3D model of the first type of entity, the 3D model having tracked model parameters;
selecting candidate values for the tracked model parameters, wherein the selection comprises:
selecting a first set and second set of candidate values;
rendering, from the 3D model using the first set and second set of candidate values, respective second and third simulated raw time of flight image data, the second and third simulated raw time of flight image data including historical data that is perturbed to generate a first and second predicted pose corresponding to the 3D model with the first and second set of candidate values respectively;
comparing the second simulated raw time of flight image data and at least part of the received first raw image data and the third simulated raw time of flight image data and the at least part of the received first raw image data; and
determining that the second simulated raw time of flight image data corresponding to the 3D model with the first set of candidate values used to generate the first predicted pose is closer to the first raw image data than the third simulated raw time of flight image data corresponding to the 3D model with the second set of candidate values used to generate the second predicted pose; and
in response to determining that the second simulated raw time of flight image data is closer to the first raw image data, selecting the first predicted pose as an estimated pose of the entity; and
outputting the estimated pose of the entity.

* * * * *